United States Patent [19]

Sizer et al.

[11] Patent Number: 5,275,038

[45] Date of Patent: Jan. 4, 1994

[54] DOWNHOLE REELED TUBING INSPECTION SYSTEM WITH FIBEROPTIC CABLE

[75] Inventors: Phillip S. Sizer, Dallas; Donald H. Perkins, Carrollton; Robert A. Rademaker, The Colony, all of Tex.

[73] Assignee: Otis Engineering Corporation, Dallas, Tex.

[21] Appl. No.: 702,827

[22] Filed: May 20, 1991

[51] Int. Cl.$^5$ .................. E21B 47/00; E21B 47/12
[52] U.S. Cl. .................. 73/151; 358/100; 340/854.7; 340/854.9; 367/86; 367/35; 385/101; 385/107
[58] Field of Search .......... 73/151, 152; 166/255, 166/302; 385/101, 107, 108; 340/854.7, 854.9; 358/94, 100; 367/35, 86, 911; 181/105

[56] References Cited

U.S. PATENT DOCUMENTS

| | | | |
|---|---|---|---|
| 2,632,801 | 3/1955 | Donaldson | 358/100 |
| 2,849,530 | 8/1958 | Fleet | 358/100 |
| 2,852,600 | 9/1958 | Jenkins, Jr. | 358/100 |
| 2,912,495 | 11/1959 | Moon et al. | 358/100 |
| 3,066,969 | 12/1962 | Camac | 358/100 |
| 3,075,113 | 1/1963 | Soar | 358/100 |
| 3,114,799 | 12/1963 | Waters et al. | 358/100 |
| 3,320,359 | 5/1967 | Ikegami | 358/87 |
| 3,825,078 | 7/1974 | Heilhecker et al. | 175/57 |
| 3,825,079 | 7/1974 | Heilhecker | 175/57 |
| 3,984,627 | 10/1976 | Galerne | 178/6.8 |
| 4,098,342 | 7/1978 | Robinson et al. | 166/315 |
| 4,229,762 | 10/1980 | Healy | 358/100 |
| 4,238,158 | 12/1989 | Sington | 356/241 |
| 4,630,243 | 12/1986 | MacLeod | 367/82 |
| 4,665,281 | 5/1987 | Kamis | 174/102 R |
| 4,687,293 | 8/1987 | Randazzo | 350/96.23 |
| 4,711,122 | 12/1987 | Angehrn et al. | 73/151 |
| 4,766,577 | 8/1988 | Clerke et al. | 367/911 |
| 4,780,858 | 10/1988 | Clerke | 367/35 |
| 4,829,488 | 5/1989 | Seigfried, II | 367/69 |
| 4,855,820 | 8/1989 | Barbour | 358/100 |
| 4,924,870 | 5/1990 | Wlodarczyk et al. | 128/667 |
| 4,938,060 | 7/1990 | Sizer et al. | 358/100 |
| 4,941,349 | 7/1990 | Walkow et al. | 73/151 |
| 4,964,685 | 10/1990 | Savitsky et al. | 350/96.2 |
| 4,971,147 | 11/1990 | Thomeer | 166/65.1 |
| 5,000,539 | 3/1991 | Gareis | 350/96.23 |
| 5,007,697 | 4/1991 | Chadna et al. | 350/96.15 |
| 5,140,319 | 8/1992 | Riordun | 358/100 |

FOREIGN PATENT DOCUMENTS

| | | |
|---|---|---|
| 0112148 | 12/1983 | European Pat. Off. |
| 1590563 | 3/1978 | United Kingdom |
| 2126372 | 3/1983 | United Kingdom |

OTHER PUBLICATIONS

U.S. Patent Application Ser. No. 07/540,573, filed Jun. 15, 1990, and assigned to Westech Geophysical, Inc.

Primary Examiner—Hezron E. Williams
Assistant Examiner—Michael Brock
Attorney, Agent, or Firm—Johnson & Gibbs

[57] ABSTRACT

A system for the inspection of a well borehole and the formation around the borehole. The system includes a pair of concentric reeled tubings for injecting a pair of fluids into a wellbore through a wellhead, one of said fluids being an optically transparent or acoustically homogenous fluid which forms a slug of said fluid around an optical sensor which transmits signals indicative of well conditions to the surface. The other of said fluids is used to perform functions with respect to said sensor such as cooling said sensor or protect it from a corrosive environment. In addition, a fiberoptic cable construction in combination with the reel tubing is also disclosed.

28 Claims, 3 Drawing Sheets

DOWNHOLE REELED TUBING INSPECTION SYSTEM WITH FIBEROPTIC CABLE

CROSS REFERENCE TO RELATED APPLICATIONS

This application contains subject matter related to co-pending U.S. patent application Ser. No. 07/703,287 entitled "Reeled Tubing Support for Downhole Equipment Module", filed on even date herewith and assigned to the assignee of the present invention. Such application and the disclosures therein are hereby incorporated by reference herein.

BACKGROUND OF THE INVENTION

1. Field of the Invention

The invention relates to downhole inspection systems and, more particularly to a fiberoptic cable assembly for use within reeled tubing. The invention may be used in connection with the maintenance and servicing of oil, gas, geothermal and injection wells.

2. History of the Prior Art

In the drilling and production of oil and gas wells, it is often necessary to obtain at the surface information concerning conditions within the borehole. For example, tools and other objects may become lodged in the borehole during the drilling of a well. Such objects must be retrieved before drilling can continue. When the removal of foreign objects from a borehole is undertaken, known as "fishing", it is highly desirable to know the size, position, and shape of the obstructing object in order to select the proper fishing tool to grasp the object and remove it from the borehole. Such information is very difficult to obtain because of the hostile downhole environment within a borehole filled with opaque drilling fluid.

In the operation and/or periodic maintenance of producing injection wells, it is also frequently necessary to obtain information about the construction and/or operating condition of production equipment located downhole. For example, detection of the onset of corrosion damage to well tubing or casing within a borehole enables the application of anti-corrosive treatments to the well. Early treatment of corrosive well conditions prevents the highly expensive and dangerous replacement of corrosion damaged well production components. Other maintenance operations in a production well environment, such as replacement of various flow control valves or the inspection of the location and condition of casing perforations, make it highly desirable for an operator located at the surface to obtain accurate, real-time information about downhole conditions. The presence of production fluids in the well renders accurate inspection very difficult.

Various techniques have been proposed for obtaining at the surface information about the conditions within a borehole. One approach has been to lower an inspection device, such as a acoustic inspection sensor or an optical inspection sensor, attached to the end of reeled tubing as shown in U.S. Pat. No. 4,938,060 to Sizer, et al. In this system, a quantity of optically clear and/or acoustically homogeneous fluid is directed down the reeled tubing and exits at the lower end thereof in the region of the sensor. The exiting fluid forms a narrow zone of optically transparent and/or acoustically homogenous fluid within an inspection zone inside of the borehole to allow the inspection sensor to accurately observe conditions within the borehole. This system is a substantial improvement over prior art downhole inspection techniques. However, certain specialized operating conditions may occur within the borehole during the inspection process which require certain modifications to the system taught in the above referenced Sizer et al patent.

In certain situations it may desirable to perform additional operations downhole while at the same time conduct an optical or acoustic inspection by means of the optically transparent or acoustically homogenous fluid being sent down the reeled tubing. For example, it may be desirable to circulate a cooling fluid through the electronic equipment with which the inspection is being performed in order to maintain a proper operating temperature of that equipment. Additionally, it may be desirable to inject a corrosion inhibiting fluid at the same time the inspection operation is going on in order to protect the inspection equipment from a highly caustic and corrosive environment within the borehole. The configuration of the system of the present invention enables these additional features and functions.

An additional problem associated with the operation of an inspection system of the type shown in the above referenced Sizer et al patent is that of bringing information gathered during the inspection process up the borehole to the surface while at the same time sending control signals downhole to control the inspection sensor such as a television camera. One form of cable used for the transmission of television signals is that of fiberoptics. While such cables and means for their interconnection are well known, as in U.S. Pat. Nos. 4,924,870 and 4,964,685, respectively, the use of fiberoptic cables in a downhole environment is relatively specialized. Moreover, even though it is also known to thread a cable through a length of reeled tubing, as shown in U.S. Pat. No. 4,971,147, the adaptation of a fiberoptic downhole cabling system requires specialized characteristics and features. For example, the cabling used for this purpose must be furnished in extremely long lengths and, as a result, be relatively strong in order to support extremely long lengths of its own weight extending down the borehole. Further, in certain applications the fluids within the borehole are also highly corrosive and a means to protect such cabling from the deleterious affects of a highly corrosive environment is not only desirable but in some cases essential in order to enable the operation.

It would be a major improvement in downhole inspection systems in which an optically clear or acoustically homogenous fluid is injected in the borehole in the zone where inspection is desired to enable the simultaneous injection of a second fluid to serve a different function and to provide an improved cabling arrangement to use in connection with the reeled tubing to carry both power and information and control signals between the surface and the downhole equipment.

SUMMARY OF THE INVENTION

The present invention relates to an improved method and apparatus for inspecting the interior of a borehole.

In one aspect, the system of the present invention provides a pair of concentric fluid conduits extending from the surface of a borehole to a location within the borehole at which inspection is desired. An inspection sensor is mounted to the pair of conduits near the lower end thereof for sensing the downhole borehole conditions. At the surface, there is connected to one of the conduits a means for pumping a selected quantity of clear fluid down the conduit from the surface and out into the borehole in the zone of inspection. This first fluid forms an optically transparent or acoustically homogenous region within the borehole adjacent the zone of inspection to allow the accurate inspection of conditions in the borehole by the sensor. At the surface, there is also connected to the second circuit means for pumping a second selected quantity of fluid down the other conduit from the surface for a purpose axillary to that of providing the optically transparent acoustic to the homogenous region. Such purpose might include cooling the inspection equipment or providing a corrosion inhibiting fluid for protection of such equipment.

In another aspect, the invention includes threading a multi-component fiberoptic cable axially along the inside of a length of reeled tubing. An inspection sensor is mounted to the tubing near the lower end thereof for sensing downhole borehole conditions and the fiberoptic cable is connected to that sensor for passing information between the sensor and the surface. The cable also includes strands of metal electrical conductors for passing power and control signals to the sensor and providing an enhanced strength to the cable.

In still another aspect of the invention, there is included an assembly which comprises a length of reeled tubing having a cable threaded through the interior of the tubing which includes a fiberoptic core with a first layer of insulative material around the core. A first plurality of strands of electrically conductive wires surround the first insulative layer and a second layer of insulative material surrounds the plurality of strands of conductive wires. A second plurality of strands of electrically conductive wires surrounds the second insulative layer for providing both strength and electrical conductivity to the cable.

In a further aspect of the invention, there is included a system for inspecting the interior of a borehole which includes a reeled tubing unit having a reel with a length of tubing wound thereon and an injector for inserting the tubing on the reel down into a borehole into a location at which inspection is to occur. An inspection sensor is mounted to the end of the reeled tubing to be inserted into the borehole. A second length of tubing extends axially within the first length of tubing and is also wound on the reel. The interior of the second length of tubing forms a first fluid passageway and the annular space between the first and second lengths of tubing form a second passageway. A first pump is connected to the end of the reeled tubing located at the surface for supplying pressurized optically transparent and/or acoustically homogenous fluid to one of the passageways within the reeled tubing. A fluid injection nozzle is mounted to the lower end of the reeled tubing and in fluid communication with one of the passageways within the interior of the tubing for allowing a flow of fluid from within the tubing out into the borehole to produce a fluid inspection zone within the borehole in the region of the sensor and enable the sensor to accurately inspect physical conditions within the borehole. A second pump is connected to the end of the reeled tubing located at the surface for supplying a second fluid down the other of the passageways within the tubing. A fluid flow passageway is associated with the sensor and connected to the other of the passageways for receiving the flow of the second fluid and directing it around the sensor for performing an auxiliary function with respect to the condition and use of the sensor.

BRIEF DESCRIPTION OF THE DRAWING

For a more detailed understanding of the present invention and for further objects and advantages thereof, reference can now be had to the following description taken in conjunction with the accompanying drawing, in which.

DETAILED DESCRIPTION OF THE PRESENT INVENTION

Figure 1:
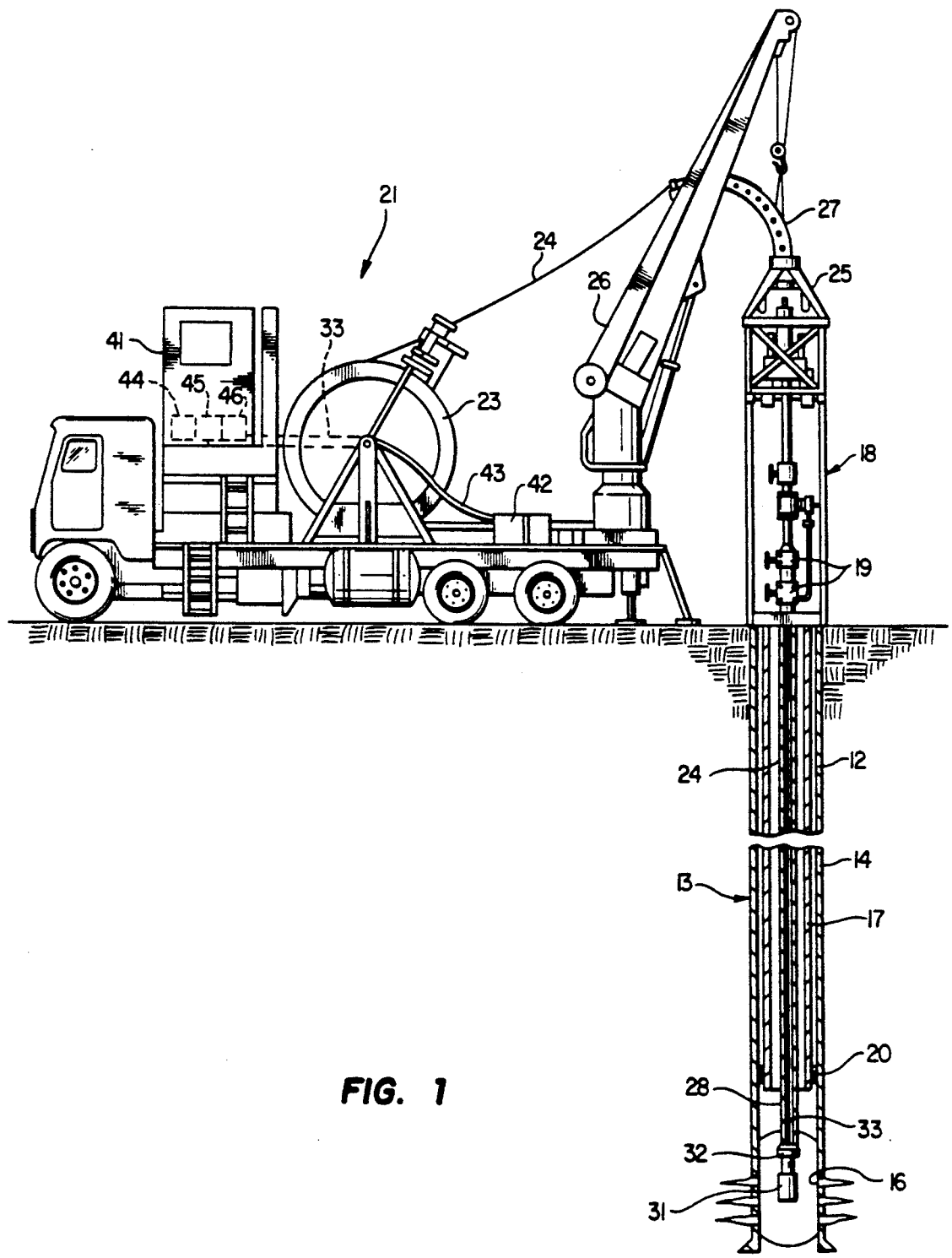
FIG. 1 is an illustrative schematic drawing, partially in elevation and partially in cross-section, showing a borehole inspection system constructed in accordance with the teachings of the present invention.

Referring to FIG. 1, there is shown a borehole 12 forming part of a completed production well 13 which includes a casing 14 extending from the surface to the production zone 15 of the well. The casing includes a plurality of perforations 16 formed in the wall thereof to allow the influx of production fluids from the producing formation into the borehole for removal at the wellhead. A production packer 20 is positioned between the tubing 17 and the casing 14 above the production zone 15.

A string of production tubing 17 extends from the wellhead production completion equipment 18, known as a "christmas tree", to allow the fluids flowing into the casing 14 from the formation to be received at the surface for collection as production fluids from the well. The various valves 19 at the wellhead 18 control the flow of production fluids brought to the surface through the tubing 17.

Also shown in FIG. 1 is an item of production well maintenance equipment 21 known as a reeled tubing unit. This system comprises a truck 22 onto a bed of which is mounted a large mechanically operated reel 23 upon which is wound a continuous length of metal tubing 24 capable of withstanding relatively high pressures. The tubing 24 is slightly flexible so as to be able to allow coiling of the tubing onto the reel 23. A reeled tubing injector unit 25 is suspended over the wellhead 18 by a hydraulic crane 26 and is directly attached to the wellhead. The injector 25 includes a curved guide way 27 and a hydraulic means for injecting the reeled tubing 24 down into the well tubing 17 while the well remains under production pressure. A sufficient length of tubing 24 is inserted into the well that the lower end of the reeled tubing 28 extends out the lower end of the production tubing 17 into the region of the borehole inside the casing 14. The production zone 15 is deemed, for purposes of illustration, to be the borehole inspection zone of interest. An inspection sensor 31 is shown positioned in that region.

Attached to the lower end of the reeled tubing 28 is a downhole inspection sensor assembly 31 and a fluid injection nozzle 32 which is in fluid communication with the inside of the reeled tubing 24. A fiberoptic and electrical cable 33 is connected to the sensor 31 and extends longitudinally up the interior of the reeled tubing 24 to the receiving and control equipment located at the surface adjacent the wellbore. The tubing 24 conducts injection fluid to a precise location within the borehole as well as protects the length of fiberoptic communication cable 33 extending between the inspection sensor 31 and the surface.

The reeled tubing unit 21 also carries an operator control housing 41 and a pair of pumps 42 connected to the upper end 43 of the reeled tubing 24 to supply pressurized fluids into the tubing from the surface. The pumps 42 are connected to a supply of fluid (not shown). A pump control console 44 is located within the operator housing 41 and adapted to control the operation of the pumps 42. The upper end of the fiberoptic cable 33 extending longitudinally along the interior of the reeled tubing 24 is connected to a sensor control unit 45 and to a sensor monitor 46 both of which are located within the operator housing 41.

The sensor assembly 31 may include, for example, a television camera or an acoustical transmitter/receiver. Alternatively, other types of inspection devices such as conventional photographic cameras or high energy radiation sensors might also be employed for particular applications. In the event that a television camera is used as the sensor, the downhole assembly 31 would also include a lighting system and the fiberoptic cable 33 is used to carry both electrical power and control signals downhole to power the lights and camera and control the camera as well as video signals back uphole from the camera to the sensor control unit 45 and television monitor 46. In addition, the sensor control unit 45 also includes a video recording system for providing a permanent record of the borehole inspection signal produced by the television camera.

Figure 2:
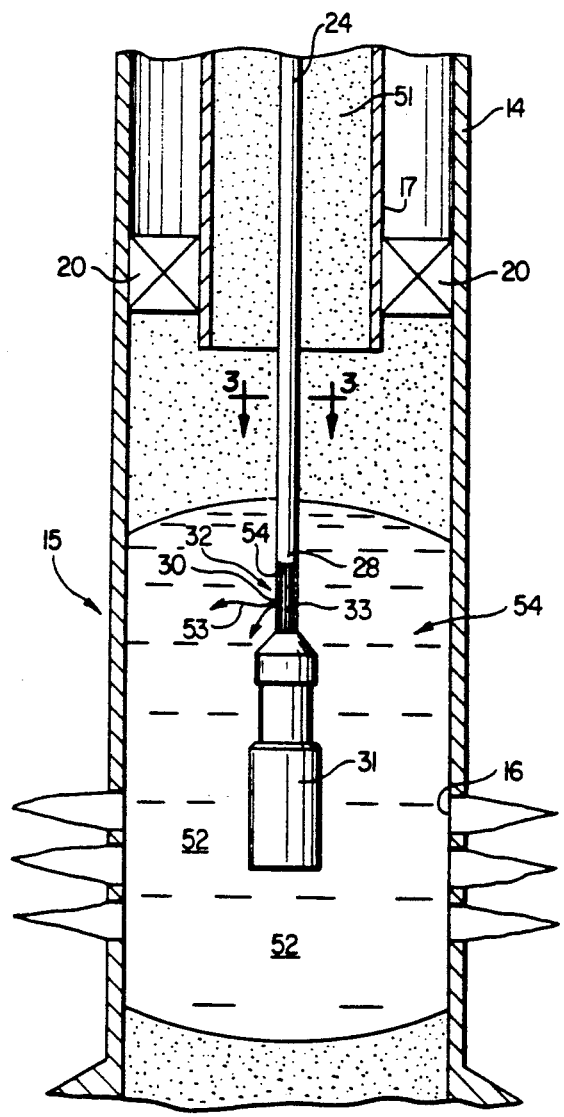
FIG. 2 is an elevational cross-section view of the lower end of the tubing showing the sensor of the inspection system shown in FIG. 1 and the zone of inspection within the borehole.

Referring now to FIG. 2, there is shown an enlarged cross-section view of the lower end 28 of the reeled tubing 24 and the borehole inspection zone 15. The lower end of the production tubing 17 is sealed on the outside against the inner wall of the casing 14 by means of the production packer 20. Production fluids 51 which flow into the casing 14 through the perforations 16, travel up the tubing 17 toward the wellhead. The production fluids 51 generally comprise oil, salt water, and other opaque and frequently non-homogenous fluids.

As discussed above in connection with FIG. 1, the pumps 42 are connected to the upper end 43 of the reeled tubing 24 and to one or more supplies of fluid. From the surface, an optically clear and/or acoustically homogenous fluid 52, from one of the sources connected to one of the pumps 42, is pumped down the reeled tubing 24 in the direction downhole and toward the nozzle 32 in the lower end 28 of the reeled tubing. This fluid forms an isolated zone or "pill" 54 of optically transparent and/or acoustically homogeneous fluids 52 in the region of the inspection sensor 31. This enables the sensor 31 to accurately inspect the interior conditions within the borehole. For example, with the injection of pill 54 of clear fluid the condition of the inner side walls of the casings 14 can be optically and/or acoustically inspected without any obstruction from the opaque, non-homogenous borehole fluids 51 normally present within the borehole. Signals produced by the sensor 31 are relayed up the fiberoptic cable 33 to the sensor monitoring and control unit 45 within the operator housing 41 located at the surface.

The fluid 52 which is forced down the reeled tubing 24 under pressure by means of pumps 42 located at the surface, may comprise a number of different fluids depending upon the inspection sensor selected for the particular application and operating conditions. For example, a clear fluid media such as water, nitrogen, light hydro-carbons, natural gas, $CO_2$, and many others may be acoustically homogenous and optically clear and thus provide a suitable medium for careful and accurate inspection of the downhole conditions by the sensor.

Figure 3:
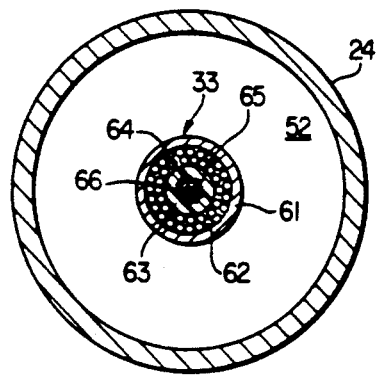
FIG. 3 is a cross-section view taken along the lines 3—3 of FIG. 2.

Referring next to FIG. 3, there is shown a cross-section view about the lines 3—3 of FIG. 2 which shows the reeled tubing 24 together with the axially extending fiberoptic cable 33 which extends the length of the reeled tubing between the surface control equipment and the sensor 31. The optically clear and/or acoustically homogenous fluid 52 flows downhole in the annular region between the outside of the fiberoptic cable 33 and the inside wall of the reeled tubing 24. The fiberoptic cable 33 comprises a plurality of concentric layers including an outer metal shield 61 preferably formed of corrosion resistant material such as stainless steel, protects the cable from the corrosive environment in the event fluid is used within the reeled tubing from which such protection is required. The outer metal casing or shield 61 also provides longitudinal strength to the cable 33 and enables longer lengths of it to be employed for deeper operation. Next, within the outer shield 61 is a plurality of layers of stranded metal filaments 62 which provide both longitudinal strength to the cable 33 as well as an electrical conductor in electrically conductive engagement with the outer metal shield 61 as one of a pair of conductors extending the length of the cable 33. The next layer within the stranded conductor 62 is a layer of insulative material 63 which separates the conductive strand 62 from a ring of smaller metal strands 64 which form a second conductor extending the length of the cable 33. Next within the ring of metal conductors 64 is an insulative layer 65 which surrounds and protects an inner optical fiber core 66. The optical fiber core 66 may include either a single fiber or a plurality of separate fibers through which information may be transmitted in accordance with well accepted optical transmission techniques including both analog signal modulation as well as digital modulation. The cable 33 shown in FIG. 3 within the length of reeled tubing 24 is capable of carrying information along the fiberoptic strand 66 as well as by means of the pair of electrical conductors comprising the outer conductive strands 62 and the inner conductive strands 64 which together form a pair of isolated electrical conductors.

Figure 4:
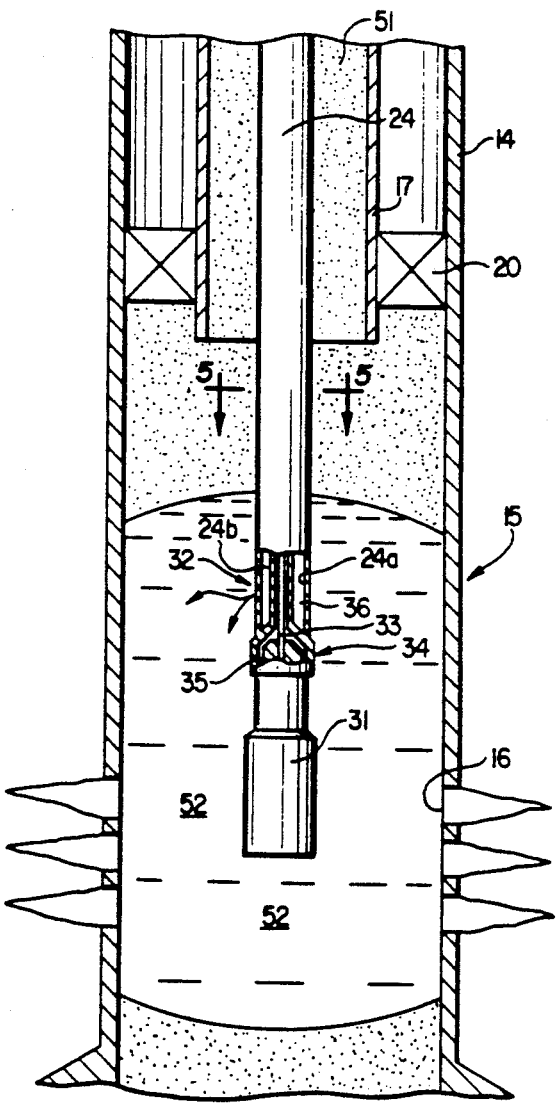
FIG. 4 is an elevational cross-section view of the lower end of the tubing partially cut-away showing an alternative embodiment of tubing construction for the inspection system shown in FIG. 1.

Referring next to FIG. 4, there is shown an enlarged, cross-section view of the lower end 28 of an alternate embodiment of the system of FIG. 2 containing a pair of concentric reeled tubings extending into the borehole inspection zone 15. The lower end of the production tubing 17 is sealed on the outside against the inner wall of the casing 14 by means of the production packer 20. Production fluids 51 which flow into the casing 14 through the perforations 16, travel up the tubing 17 toward the well head. As in the embodiment of FIG. 2, discussed above, the pumps 42 are connected to the upper end 43 of the concentric reeled tubings 24 and to a pair of fluid supplies. The concentric reeled tubings 24 comprise an outer larger diameter tubing 24a and an inner smaller diameter tubing 24b which extends axially along and within the outer tubing 24a. The fluid flowing in the annular region between outer tubing 24a and inner tubing 24b may exit through nozzle 32 in the lower end 28 of the reeled tubing. The sensor 31 is coupled to the lower end of the tubings 24 by means of a coupling 34 which includes an inner fluid flow passageway 35 in fluid communication with the interior of the inner tubing 24b. Thus, from the surface an optical clear and/or acoustically homogenous fluid 52 drawn from a first source connected to a first one of the pumps 42, is pumped down the reeled tubing 24 in the annular space between the outer tubing 24a and the inner tubing 24b toward the nozzle 32 in the lower end of the reeled tubing. This fluid forms the isolated zone or "pill" 54 of optically transparent and/or acoustically homogenous fluid 52 in the region of the inspection sensor 31. In addition, the special purpose fluid 36 is pumped from the surface from a second source connected to the pumps 42 down the reeled tubing comprising the confines of the inner tubing 24b and through the fluid passages 35 in the coupling 34 and into connecting fluid passages 35 located within the sensor 31. The second fluid 36 flowing down the inner tubing 24b may comprise a cooling fluid such as liquid nitrogen or water used to cool the circuitry of the sensor 31 and enable it to operate in an efficient manner in the often high temperature and hostile borehole environment. Similarly, the fluid down the inner tubing 24b may alternatively comprise other fluids such as corrosion inhibitors which could be used to enshroud the exterior of the sensor 31 and prevent corrosion thereof while it is present in extremely hostile and corrosive environments within the borehole.

Figure 5:
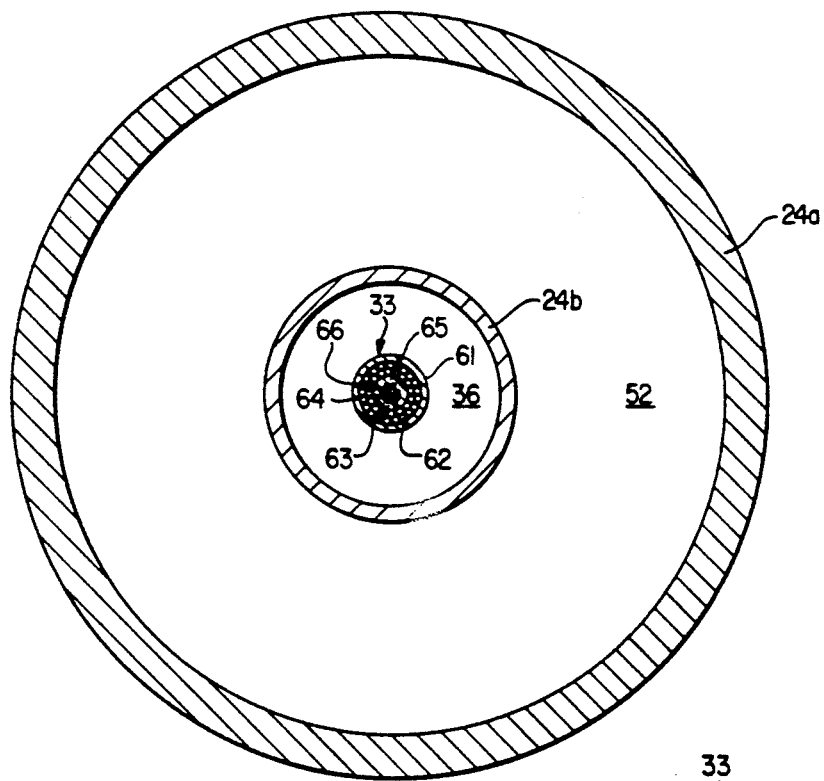
FIG. 5 is a cross-section view taken about the lines 5—5 of FIG. 4.

Referring next to FIG. 5, there is shown a cross-sectional view taken about lines 5—5 of FIG. 4 which illustrates the outer concentric tubing 24a within which is positioned the smaller inner tubing 24b. The optically transparent and/or acoustically homogenous fluid 52 is pumped down the annular region between the outer tubing 24a and the inner tubing 24b while the second fluid 36 is pumped down the inner tubing 24b between the inner wall of that tubing and the outer wall of the fiberoptic cable 33. The cable 33 may be similar in construction to the cable illustrated and discussed above in connection with FIG. 3 and include an outer metal shield 61 within which is contained a circular array of stranded conductive metal filaments 62, forming one conductor of a pair within the cable 33. In addition, within the conductor 62 is an insulative layer 63 within which is contained another ring of stranded filaments 64 forming the second conductor of the conductive pair within the cable 33. Inside the second ring of conductors 64 is another insulative layer 65 which houses a fiberoptic core 66 for conducting information from the inspection sensor to the receiving equipment uphole.

Figure 6:
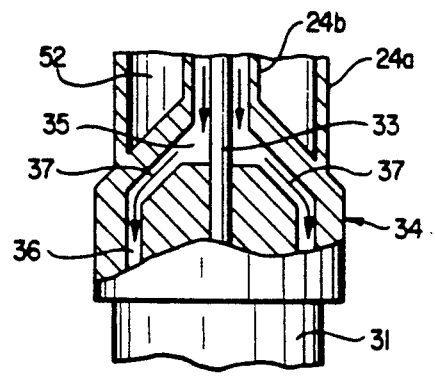
FIG. 6 is an enlarged view of the partially cut-away portion shown in FIG. 4.

Referring now to FIG. 6, there is shown an enlarged view of the coupling 34 located between the sensor 31 and the concentric tubings 24a and 24b. As discussed above, the optically transparent and/or acoustically homogenous fluid 52 is pumped downhole in the first passageway comprising the annular space between the outer tubing 24a and the inner tubing 24b. The second fluid 36 is pumped downhole through the second passageway comprising the inside of the inner tubing 24 and the annular space between the inner wall thereof and the outer wall of the fiberoptic cable 33. The fluid 36 flows through the fluid flow passageways 35 in the direction of the arrows 37 and provides an additional fluid that performs functions such as cooling, corrosion inhibition, treatment, etc.

Figure 7:
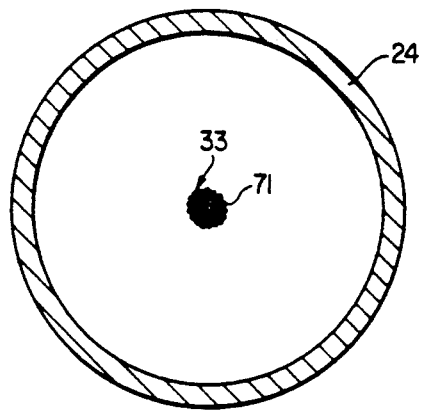
FIG. 7 is a cross-section view taken along the lines 3—3 of FIG. 2 and shows an alternative embodiment of a fiberoptic cable used in the invention to that shown in FIG. 3.

Referring next to FIG. 7, there is shown a cross-section diagram of an alternative embodiment of fiberoptic cable 33 which can be used within the interior of the reeled tubing as shown in FIGS. 2 and 3. In this embodiment of the fiberoptic cable, the reeled tubing 24 contains within it a cable 33 having an outer layer of stranded metal conductors 71 which are spirally wrapped for added strength within which is contained a plurality of additional layers.

Figure 8:
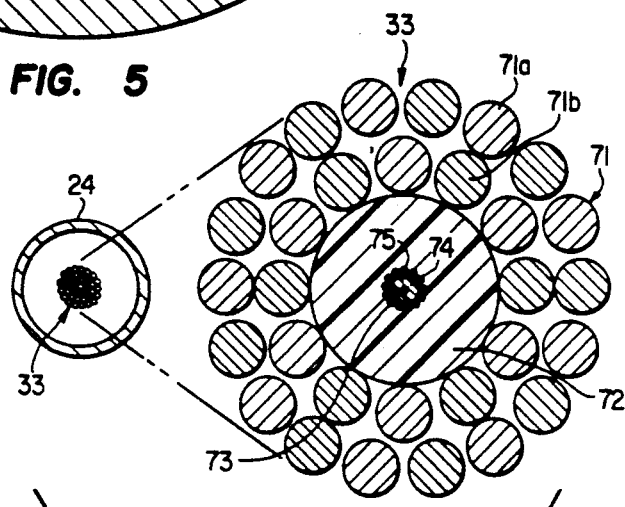
FIG. 8 is a illustrative, enlarged view of the fiberoptic cable shown in FIG. 7.

Referring to FIG. 8, there is shown an enlarged view of the cable and tubing of FIG. 7. In FIG. 8, it can be seen how the outer layer of stranded cabling comprising an outer ring of conductors 71a and an inner concentric ring of conductors 71b is provided for both strength of the cable as well as a conductive layer comprising one conductor of a pair of electrical conductors within the cable 33. In the interior of the stranded conductor 71 there is a layer of insulation, which may be formed of plastic, rubber or other suitable insulative materials and within the insulative layer is another ring of stranded electrical conductors 73 each smaller in diameter than each of the conductors in the outer layer 71. These conductors 73 are positioned contiguous with one another to form a second conductor of a pair of electrical conductors extending the length of cable 33, in combination with conductive strands 71. Located within the interior of the ring of conductive filaments 73 is another layer of insulative material 74 within which is located one or more fiberoptic strands having a core 75. The multiple layers of metal strands and insulative material, of course, also serve to protect the more delicate fiberoptic strands in the interior of the cable 33.

Figure 9:
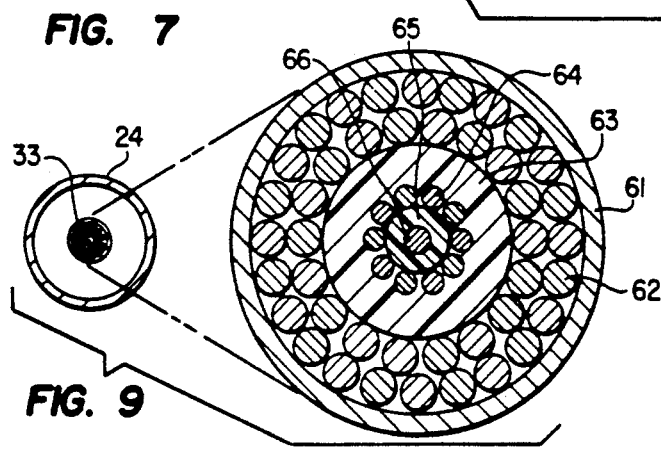
FIG. 9 is an enlarged view of an alternative embodiment of a fiberoptic cable used in connection with the system of the present invention.

Referring now to FIG. 9, there is shown an enlarged, cross-sectional view of the cable 33 shown within the interior of tubing 24 in FIG. 3. As shown, an outer metal shield 61 surrounds a layer of stranded filaments 62 which in turn surround an insulative layer 63. Within the insulation is a second layer of conductive strands 64 which surround an insulative layer 65 within which is contained a fiberoptic core 66. Each of the cables shown in the enlarged views of FIGS. 8 and 9 within the interior of sections of reeled tubing 24 are capable or providing communication within the inspection system described above. Both contain not only a pair of electrically conductive regions for carrying electrical power downhole to the sensor equipment as well as control signals to the equipment but, in addition, a fiberoptic cable comprising one or more optical strands for the transmission of monitored data back uphole from the sensor to the monitoring equipment located at the surface. In addition, the plurality of metal strands within the cable 33 provide strength to the cable and allow it to be provided in extended lengths without undue stress on parts of the cable. The embodiment of the cable shown in FIG. 9 also includes an external metal sheet 61 which is particularly useful in the event the fluids flowing within the interior of the tubing 24 comprise highly caustic and/or abrasive fluids which produce injury to the cable without such protection. The materials forming the metal outer shield 61 may include various components such as stainless steel, "Inconel", titanium, and other materials.

Referring again to FIGS. 1 and 2, one method of operation of the system including the cable and tubing configurations of the present invention is as follows. The reeled tubing 21 is positioned above the wellhead of a borehole 12 to be inspected and the reeled tubing injector 25 is used to inject a length of the tubing 24 down the production tubing 17 extending into the borehole. The inspection sensor 31 and the flow control nozzle 32 is carried on the lower end of the reeled tubing 28 into the borehole.

When the lower end of the reeled tubing 28 has reached the location of the inspection zone 15 within the borehole where it is desired to begin inspection, the pumps 42 are used to force an optically clear and/or acoustically homogenous fluid from a supply thereof located at the surface down the length of reeled tubing 24 under control of the pump control unit 44. When a sufficient quantity of optically clear and/or acoustically homogenous fluid 52, as illustrated in region 54 of FIG. 2, has been ejected from the lower end of the reeled tubing 28 so as to create an optically and/or acoustically transparent region 54 in the zone adjacent the inspection sensor assembly 31, inspection is begun. The inspection sensor 31 is enabled by means of the "pill" 54 of homogenous fluid 52 to accurately inspect the conditions within the zone of the transparent region 54 and provide a signal up the fiberoptic cable 33 to the sensor control panel 45 and the sensor monitor 46. At this location, an operator at the surface can accurately monitor the downhole conditions and create a record of the downhole conditions by means of a recording device. With respect to the embodiment shown in FIGS. 1 and 4, at the same time the optically clear and/or homogenous fluid is pumped down the annular region between the outer tubing 24a and the outer wall of the inner tubing 24b, a second fluid, such as a cooling fluid 36, is pumped down the inner tubing 24 between the inner walls thereof and the outer wall of the fiberoptic cable 33 and circulated through the fluid flow passages 35 within the body of the inspection sensor 31.

It is thus believed that the operation and construction of the present invention will be apparent from the foregoing discussion. While the method, apparatus and system shown and described has been characterized as being preferred, it would be obvious that various changes and modifications may be made therein without departing from the spirit and scope of the invention as defined in the following claims.

What is claimed is:

1. A system for inspecting within a borehole comprising:
    a first length of conduit extending from the surface through the borehole down into the zone where the inspection is to occur;
    a second length of conduit extending from the surface through the borehole down into the zone where the inspection is to occur, said second length of conduit being smaller in diameter than the said first length and being axially positioned within said first length of conduit to define an annular space therebetween, said annular space forming a first fluid passageway and the interior of said length of second conduit forming a second fluid passageway;
    a sensor mounted on the lower end of said conduits for inspecting conditions within the borehole;
    means for pumping from the surface down one of the passageways through the concentric lengths of conduits into an inspection region adjacent the sensor, a first fluid which provides a medium conducive to accurate inspection of conditions within the borehole by the sensor; and
    means for pumping from the surface down the other passageway a second fluid which performs an auxiliary function concerning the sensor.

2. A system as set forth in claim 1, wherein said second fluid is used for cooling said sensor.

3. A system as set forth in claim 1, wherein said second fluid comprises a corrosion inhibiting fluid for protection of said sensor within the environment of the borehole.

4. A system as set forth in claim 1, wherein said sensor includes an outer housing allowing fluid flow therethrough and connected to said second fluid passageway of said second length of conduit for flow of said second fluid.

5. A system as set forth in claim 1 which also includes a fiber optic cable extending axially within said second length of conduit for conducting information between said sensor and the surface adjacent said borehole.

6. A system as set forth in claim 5 wherein said fiber optic cable also includes a plurality of electrical conductors to permit the transmission of electrical power to said sensor.

7. A system as set forth in claim 1 wherein said sensor comprises a television camera and said first fluid is optically transparent to permit optical inspection of said borehole by said camera.

8. A system as set forth in claim 1 wherein said conduits comprise the tubing of a reeled tubing unit.

9. A system for inspecting the interior of a borehole as set forth in claim 1 wherein said sensor comprises a television camera, said first fluid is optically transparent to permit optical inspection of said borehole by said camera and said second fluid is circulated around the body of said camera to cool it.

10. A system for inspecting the interior of a borehole, comprising:
    a reeled tubing unit including a reel having a length of tubing wound thereon and an injector for inserting the tubing on the reel down into a borehole into a location at which inspection is to occur;
    an inspection sensor mounted to the end of the reeled tubing to be inserted into the borehole;
    a second length of tubing extending axially within said first length of tubing and also being wound on said reel the interior of said second length of tubing forming a first fluid passageway and the annular space between said first and second lengths of tubing forming a second passageway;
    a first pump connected to the end of the reeled tubing located at the surface for supplying pressurized optically transparent and/or acoustically homogenous fluid to one of the passageways within said reeled tubing;
    a fluid injection nozzle means mounted to the lower end of the reeled tubing and in fluid communication with said one of the passageways within the interior of the tubing for allowing a flow of fluid from within the tubing out into the borehole to produce a fluid inspection zone within the borehole in the region of the sensor and enable the sensor to accurately inspect physical conditions within the borehole;

a second pump connected to the end of the reeled tubing located at the surface for supplying a second fluid down the other of the passageways within the tubing; and a fluid flow passageway associated with the sensor and connected to said other of the passageways for receiving the flow of the second fluid and directing it around the sensor for performing an auxiliary function concerning the sensor.

11. A system for inspecting the interior of a borehole as set forth in claim 10 wherein said system also includes a cable extending axially through said tubing from the reeled tubing unit to the inspection sensor for conducting information therebetween.

12. A system for inspecting the interior of a borehole as set forth in claim 11 wherein said cable comprises a fiber optic strand and a pair of electrically conductive strands for the transmission of information along said cable.

13. A system for inspecting the interior of a borehole as set forth in claim 11 wherein said cable includes an external metal shield to protect said cable from damage.

14. A system for inspecting the interior of a borehole as set forth in claim 11 wherein said cable includes a plurality of electrical conductors to permit the transmission of electrical power to said sensor.

15. A system for inspecting the interior of a borehole as set forth in claim 11 wherein said cable includes:
a fiberoptic core;
a first layer of insulative material around said core;
a first plurality of strands of electrically conductive wires surrounding said insulative layer;
a second layer of insulative material surrounding said plurality of conductors; and
a second plurality of strands of electrically conductive wires surrounding said second insulative layer for providing both strength and electrical conductivity to the cable.

16. A system for inspecting the interior of a borehole as set forth in claim 15 which also includes:
an elongated metal casing surrounding said second plurality of strands of electrically conductive wires.

17. A system for inspecting the interior of a borehole as set forth in claim 15 wherein said fiberoptic core comprises a single fiberoptic strand.

18. A system for inspecting the interior of a borehole as set forth in claim 15 wherein said fiberoptic core includes multiple strands of fiberoptic material.

19. A system for inspecting the interior of a borehole as set forth in claim 15 wherein each of the strands of said second plurality of strands is larger in diameter than the strands of said first plurality of strands.

20. A system for inspecting the interior of a borehole as set forth in claim 15 wherein the strands of said second plurality of strands are spirally wrapped about said second layer of insulative material.

21. A system for inspecting the interior of a borehole as set forth in claim 15 wherein said elongate metal casing is made of stainless steel.

22. A system for inspecting the interior of a borehole as set forth in claim 10 which also includes:
means located at the surface for controlling the operation of the inspection sensor and for receiving information from the operator of said sensor; and
a fiberoptic cable extending along the length of reeled tubing for connecting said inspection sensor with said controlling and receiving means at the surface to allow communication with said sensor by an operator.

23. A system for inspecting the interior of a borehole as set forth in claim 10 wherein said inspection sensor comprises a television camera and said first fluid is optically transparent to permit optical inspection of the borehole by said camera.

24. A system for inspecting the interior of a borehole as set forth in claim 10 wherein said second fluid is a cooling fluid to cool the sensor during its operation.

25. A system for inspecting the interior of a borehole as set forth in claim 10 wherein said reeled tubing unit is mounted upon a truck for transportation to the location of the borehole to be inspected.

26. A system for inspecting the interior of a borehole as set forth in claim 10 wherein said second fluid comprises a corrosion inhibiting fluid for protection of said sensor within the environment of the borehole.

27. A system for inspecting the interior of a borehole as set forth in claim 10 wherein said sensor includes an outer housing allowing fluid flow therethrough and connected to said second fluid passageway for flow of said second fluid.

28. A system for inspecting the interior of a borehole as set forth in claim 10 which also includes a fiberoptic cable extending axially within said second length of tubing for conducting information between said sensor and the surface adjacent said borehole.

* * * * *